US006296756B1

(12) United States Patent
Hough et al.

(10) Patent No.: US 6,296,756 B1
(45) Date of Patent: Oct. 2, 2001

(54) HAND PORTABLE WATER PURIFICATION SYSTEM

(75) Inventors: Gary S. Hough, Woodinville; Troy T. Johnson, Bellevue, both of WA (US)

(73) Assignee: H20 Technologies, Ltd., OR (US)

( * ) Notice: Subject to any disclaimer, the term of this patent is extended or adjusted under 35 U.S.C. 154(b) by 0 days.

(21) Appl. No.: 09/393,594

(22) Filed: Sep. 9, 1999

(51) Int. Cl.[7] .................................................. C02F 1/461
(52) U.S. Cl. ........................................ 205/744; 204/271
(58) Field of Search ............................. 204/271; 205/744

(56) References Cited

U.S. PATENT DOCUMENTS

| | | | |
|---|---|---|---|
| 1,217,643 | * | 2/1917 | Schneider .............................. 204/271 |
| 1,862,663 | | 6/1932 | Curtis ..................................... 204/271 |
| 2,468,357 | | 4/1949 | Brown .................................... 204/248 |
| 2,864,750 | | 12/1958 | Hughes, Jr. et al. ................. 204/149 |
| 3,095,365 | | 6/1963 | Green ..................................... 204/229 |
| 3,523,891 | | 8/1970 | Mehl ........................................ 210/44 |
| 3,654,119 | | 4/1972 | White et al. .......................... 204/228 |
| 3,728,245 | | 4/1973 | Preis et al. ............................ 204/275 |
| 3,819,504 | | 6/1974 | Bennett ................................. 204/289 |
| 3,865,710 | | 2/1975 | Phipps ................................... 204/228 |
| 3,925,176 | | 12/1975 | Okert ..................................... 204/152 |
| 3,943,044 | | 3/1976 | Fenn, III et al. ..................... 204/149 |
| 4,017,375 | | 4/1977 | Pohto ..................................... 204/255 |
| 4,061,556 | | 12/1977 | Reis et al. ............................. 204/271 |
| 4,107,021 | * | 8/1978 | Okazaki ................................. 204/263 |
| 4,119,517 | | 10/1978 | Hengst ................................... 204/229 |
| 4,119,520 | * | 10/1978 | Paschakarnis et al. .............. 204/276 |
| 4,132,620 | | 1/1979 | Nidola et al. ......................... 204/242 |
| 4,160,716 | | 7/1979 | Wiseman .............................. 204/270 |
| 4,180,445 | | 12/1979 | Bennett et al. ....................... 204/129 |
| 4,312,736 | | 1/1982 | Menth et al. ......................... 204/255 |
| 4,385,973 | | 5/1983 | Reis et al. ............................. 204/149 |
| 4,419,206 | | 12/1983 | Frame ................................... 204/228 |
| 4,425,216 | | 1/1984 | Neymeyer ............................. 204/270 |
| 4,436,601 | | 3/1984 | Branchick et al. ................... 204/149 |
| 4,451,341 | | 5/1984 | Miller .................................... 204/149 |
| 4,481,096 | | 11/1984 | Okazaki ................................. 204/265 |
| 4,528,083 | | 7/1985 | LaConti et al. ...................... 204/265 |
| 4,572,775 | | 2/1986 | Paniagua ............................... 204/229 |
| 4,623,436 | | 11/1986 | Umehara ............................... 204/149 |

(List continued on next page.)

FOREIGN PATENT DOCUMENTS

| | | |
|---|---|---|
| 2.150.168 | 3/1973 | (FR) . |
| 105641 | 5/1917 | (GB) . |
| WO 87/01690 | 3/1987 | (WO) . |
| WO 95/21795 | 8/1995 | (WO) . |
| WO 98/04502 | 2/1998 | (WO) . |
| WO 99/24369 | 5/1999 | (WO) . |

OTHER PUBLICATIONS

The Advanced Water Systems Incorporated, company brochure regarding information on various products to improve water quality, different types of water systems and current technology, Sep. 30, 1993.

*Primary Examiner*—Kathryn Gorgos
*Assistant Examiner*—Thomas H Parsons
(74) *Attorney, Agent, or Firm*—Seed IP Law Group PLLC

(57) ABSTRACT

A hand portable water purification system includes a portable electrolytic cell to increase the content of oxygen and chlorine in water to be purified. The electrolytic cell includes a housing and a set of electrodes. The housing provides physical support and spacing for the electrodes and protects the electrolytic cell from damage during handling and storage. The hand portable apparatus has a system control circuit that converts an external source of power to a direct current (DC) voltage to energize the electrolytic cell. The combination of the electrolytic cell and the system control circuit is small enough and light enough to be carried in a person's hand. In one embodiment, the portable electrolytic cell is mounted near the bottom of a container with one-half to five gallon capacity mounted either permanently or detachably.

29 Claims, 12 Drawing Sheets

U.S. PATENT DOCUMENTS

| | | | |
|---|---|---|---|
| 4,639,303 | 1/1987 | Staab et al. | 204/258 |
| 4,761,208 | 8/1988 | Gram et al. | 204/95 |
| 4,781,805 | 11/1988 | Dahlgren | 204/149 |
| 4,783,246 | 11/1988 | Langeland et al. | 204/95 |
| 4,784,735 | 11/1988 | Sorenson | 204/98 |
| 4,790,914 | 12/1988 | Sorenson | 204/98 |
| 4,797,182 | 1/1989 | Beer et al. | 204/14.1 |
| 4,839,007 | 6/1989 | Kötz et al. | 204/149 |
| 4,917,782 | 4/1990 | Davies | 204/152 |
| 4,936,979 | 6/1990 | Brown | 210/85 |
| 5,062,940 | 11/1991 | Davies | 204/228 |
| 5,100,502 * | 3/1992 | Murdoch et al. | 156/643 |
| 5,292,412 | 3/1994 | Pitton | 204/149 |
| 5,324,398 | 6/1994 | Erickson et al. | 204/149 |
| 5,328,584 | 7/1994 | Erickson et al. | 204/229 |
| 5,389,214 | 2/1995 | Erickson et al. | 204/149 |
| 5,427,667 | 6/1995 | Bakhir et al. | 204/260 |
| 5,460,702 | 10/1995 | Birkbeck et al. | 204/149 |
| 5,728,287 | 3/1998 | Hough et al. | 205/743 |
| 5,759,384 * | 6/1998 | Silveri | 205/743 |
| 5,876,757 * | 3/1999 | Kump | 204/197 |
| 5,911,870 | 6/1999 | Hough | 205/701 |
| 5,928,503 * | 7/1999 | Shang-Chun | 210/86 |

\* cited by examiner

HAND PORTABLE WATER PURIFICATION SYSTEM

BACKGROUND OF THE INVENTION

1. Field of the Invention

This invention relates to water treatment systems, and in particular to a water treatment system that a person can carry in one hand.

2. Description of the Related Art

The demand for water treatment systems is increasing. As population increases, the demand for water also increases. In many areas, clean drinking water may not be readily available. When a population moves from a well-established city with a water system to more remote areas, small scale and portable water treatment becomes even more important. If the water treatment can both remove the danger of contaminants and also add healthy components, then a double benefit is obtained from such a treatment.

One known water treatment method is to add oxygen to water. Some systems bubble gas containing oxygen through the water so that some of it is retained in the water. This has been shown effective from some types of large scale water treatment but is somewhat expensive and is a slow treatment technique.

Another known technique to place oxygen in water is electrolysis, which operates as follows. A voltage is applied to an electrolytic cell that is immersed in water, resulting in current flow in the water. The current flow in the water causes the water molecules to break up into their component parts of hydrogen and oxygen. Hydrogen gas and oxygen gas are thereby freed from the water. Typically, most of the hydrogen gas escapes as a gas from the water, while some of the oxygen gas is dissolved into the water. See, for example, the systems described in U.S. Pat. No. 5,728,287, issued Mar. 17, 1998, and U.S. Pat. No. 5,911,870, issued Jun. 15, 1999, owned by the same assignee as this invention. Current water treatment systems using electrolysis are usually designed to be installed in-line with the water flow path. Additionally, these systems are commonly designed to handle large volumes of water. What is not currently available is a system and method that efficiently increase the dissolved oxygen content of water off-line, and which is small enough for home use.

SUMMARY OF THE INVENTION

According to the principles of the present invention, a hand portable water purification system is provided that uses electrolysis to increase the quantity of oxygen in water to be treated. The hand portable water purification system is small enough to be carried by a person in one hand.

The hand portable water purification system has an electrolytic cell with a set of electrodes and a housing. The housing provides proper spacing, support and protection for the set of electrodes. The hand portable water purification system has a control circuit coupled to the electrolytic cell. The control circuit provides a direct current (DC) voltage to the set of electrodes when the portable electrolytic cell is immersed in water to be purified. In one embodiment, the electrolytic cell is mounted in a container and the control circuit is external to the container. In an alternative embodiment, the electrolytic cell and the control circuit are a self-contained assembly. The combination of the portable electrolytic cell and the portable system control circuit, including the container when used, are of a size and weight to be easily hand carried.

One embodiment of the hand portable water purification system operates as follows. A user programs the electrolytic cell using the control circuit to energize via the DC voltage at a predetermined point in time and to remain energized for a predetermined duration of time. The predetermined duration of time corresponds to a target dissolved oxygen content of water. In response to programming, the electrolytic cell is energized at the predetermined time. Water to be treated is circulated through the energized electrolytic cell for the predetermined duration of time such that the target dissolved oxygen content of the water is achieved. When the predetermined duration of time has elapsed, the electrolytic cell automatically de-energizes.

The user can easily transport the electrolytic cell, the control circuit, and DC voltage source as a single assembly by hand to the next water to be treated. Operation of the hand portable water purification system can be under manual control as well. That is, a user can immerse the hand portable water purification system in a glass of water, for example, and turn on and off the system without using the programming capabilities.

Further features and advantages, as well as the structure and operation of various embodiments are described in greater detail below with reference to the accompanying figures.

BRIEF DESCRIPTION OF THE FIGURES

The invention is best understood by reference to the figures, wherein references with like reference numbers indicate identical or functionally similar elements.

DETAILED DESCRIPTION OF THE INVENTION

Figure 1:
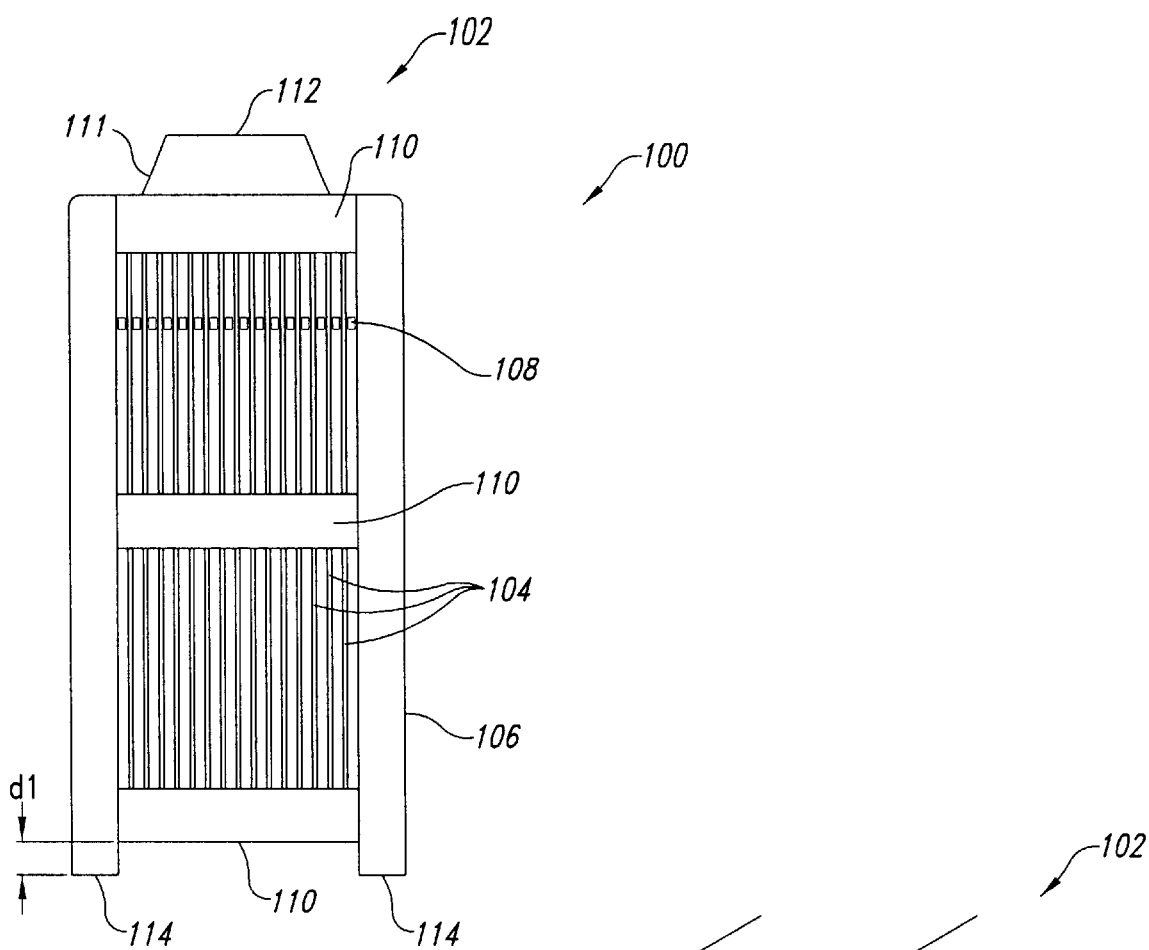
FIG. 1 is a side elevational view of a portable electrolytic cell with a set of electrodes and a housing according to one embodiment of the present invention.

FIG. 1 illustrates a hand portable water purification system 100 according to one embodiment of the present invention. The hand portable water purification system 100 includes a portable electrolytic cell 102 with a set of electrodes (or plates) 104. The individual electrodes within the set of electrodes 104 may be coupled together using a variety of different techniques as discussed later herein.

Figure 2:
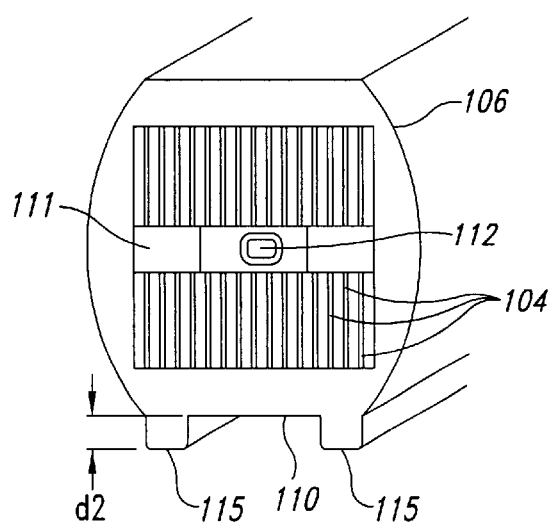
FIG. 2 is a top, isometric view of the cell of FIG. 1.

The portable electrolytic cell 102 includes a housing 106 to provide structural support and spacing for the electrodes 104. The housing 106 may include spacers 108, which maintain respective gaps between the set of electrodes 104. The spacers 108 are not used in many embodiments, but are provided in large area or heavy handling use applications. The housing 106 includes a set of slotted supports 110, which provides additional structural support and separation for the set of electrodes 104. The housing 106 includes standoffs 114 holding the cell a distance "d1" off the surface on which the housing sits upright such that when in use water flows easily around the portable electrolytic cell 102 and through the individual electrodes within the set of electrodes 104. FIG. 2 is a view of the top of the housing 106 depicting the spaces 108, an end-mounted slotted support 110, and horizontal standoffs 115 for holding the electrodes a distance "d2" above the surface. The distance d2 may be greater, less than or equal to d1. Usually it will be less since there is a greater surface area below for circulation. Power is provided through a connection 112 in the housing at the top, shown also in FIGS. 1 and 2.

In one embodiment, portable electrolytic cell 102 includes a membrane or mesh-like material surrounding the cell. The membrane or mesh-like material is a water permeable sleeve around the set of electrodes 104. The membrane prevents external objects from creating an electrical short across the set of electrodes 104. The membrane is like a fishnet, having many small holes and is sufficiently permeable to permit easy flow of water through the housing and across the plates.

The electrolytic cell 102 may be connected in a monopolar electrolytic cell circuit with four 6×1.0 inch plates operating at three to twelve volts DC and from 0.1 to 5 amperes or up to fifty amperes, and with the plates spaced 0.030 inches apart. The electrolytic cell 102 also may include up to twenty plates and operating in the range of 12 to 150 volts DC and in the range of less than 1 ampere to over 5 amperes with the plates spaced 0.030 inches apart. In the alternative, they can be connected in a bipolar mode at a higher voltage and lower current.

The electrodes 104 are depicted as having a rectangular shape, but the invention does not require elongated rectangular shaped electrodes and they could be square in shape. The set of electrodes 104 may be oval, cylindrical or other acceptable shape.

Figure 3:
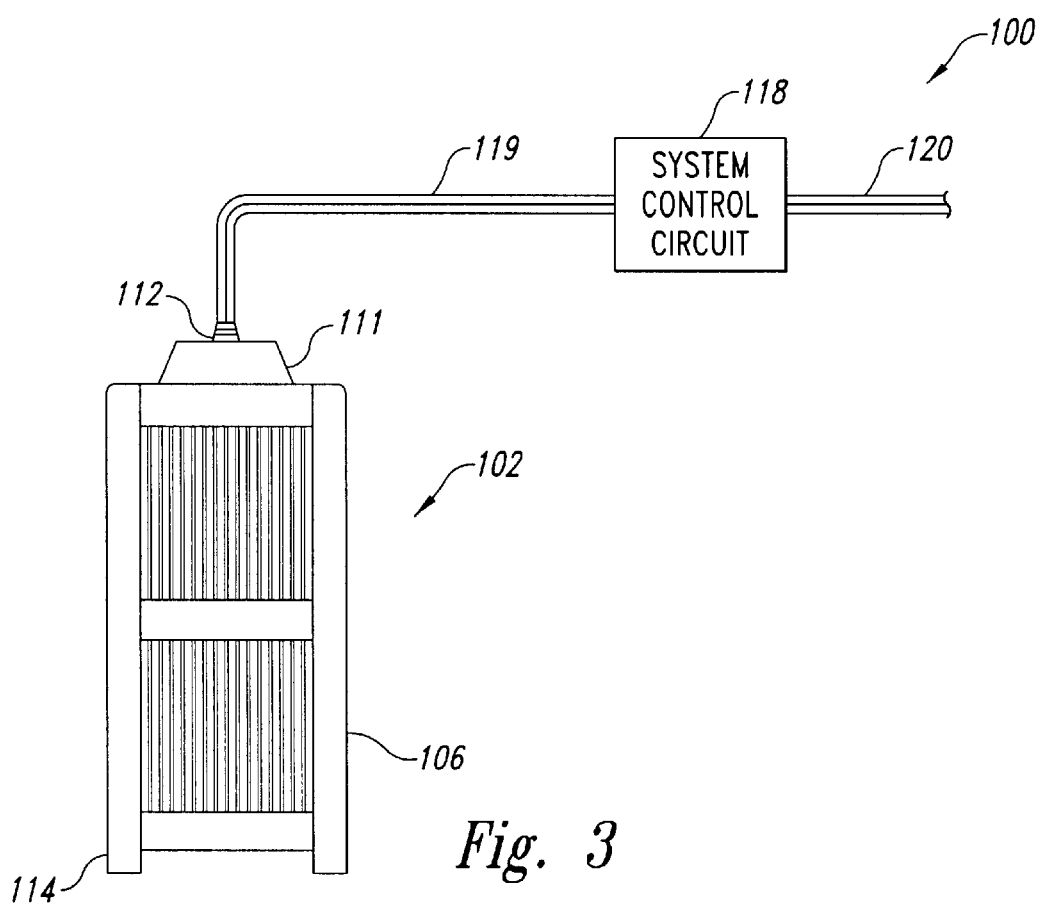
FIG. 3 is a schematic diagram of the cell of FIG. 1 and a portable system control circuit.

FIG. 3 illustrates the electrolytic cell 102 coupled to a power supply via a system control circuit 118. A power cord 120 provides power to the system control circuit 118. Power cord 119 outputs electronic controls and power from the system control circuit 118 directly to the electrolytic cell 102 within the housing 106.

Figure 4:
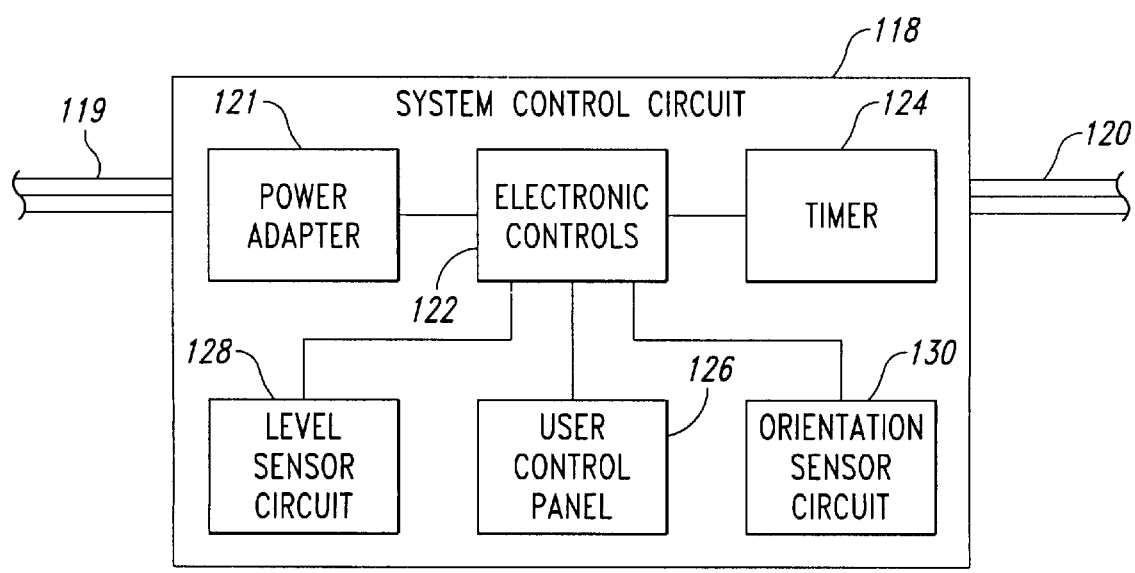
FIG. 4 is a block diagram of the portable system control circuit suitable for use in an embodiment of the present invention.

FIG. 4 illustrates an example of the electronics within the system control circuit 118. The system control circuit 118 includes a power adapter 121, which supplies a direct current (DC) voltage to the electrolytic cell 102. In one embodiment of the invention, the power adapter 121 receives power on line 120 via a standard household plug. In this embodiment, the power adapter 121 includes a transformer and AC to DC converter. The power adapter 121 may also include a voltage converter that converts alternating current (AC) voltage to direct current (DC) voltage. If the power source is a battery, the power adapter 121 may include a battery voltage control and sensor unit. Alternatively, the power adapter 121 receives power from a solar power unit or any well known power supply. Of course, those skilled in the art will appreciate that a particular power source 120 is not essential to implementation of the power adapter 121. Instead, the present invention can be practiced using a variety of power sources.

The system control circuit 118 also includes electronic controls 122, which controls the timing sequence and amount of power to be applied to the electrodes 104. For example, the electronic controls 122 includes an on/off and power control signals. Implementation of this type of electronic controls using standard microprocessors and memory is well known.

The system control circuit 118 also includes a timer 124, which aids in controlling the timing of power from the power adapter 121 to the set of electrodes 104. The length of time that power is applied determines the amount of oxygenation. A user can set the timer 124 to turn on and off the hand portable water purification system 100 in any desired pattern or sequence. For example, a user can set the timer 124 such that the hand portable water purification system 100 recharges the dissolved oxygen content of the filtered water over the course of a day to maintain a specific target dissolved oxygen content, as explained elsewhere herein.

The system control circuit 118 also includes a user control panel 126, which serves as an input and output interface between the hand portable water purification system 100 and a user. User commands entered at the control panel 126 are processed by the electronics 122 to operate all parts of the system. In one embodiment, the timer 124 is located on the user control panel 126 for direct access by the user. The timer will usually be implemented within in the electronic control 122, or user control panel 126, since electronic timers are easily constructed and are well known in the art. All microprocessors have timers and if the electronic controls 122 are of the type that include a microprocessor, then its timers could be used.

The system control circuit 118 may also include a water level sensor to detect when water covers the portable electrolytic cell 102. The level sensor electronic unit 128 may be implemented using any number of acceptable technologies known in the art. For example, a pair of sensing elements may be used such that a current flows between the sensing elements (see FIGS. 14 and 15) when water completes the electrical circuit between them. Accordingly, if both sensing elements are not covered with water a signal is output by level sensor circuit 128 to prevent electronic controls 122 from providing power to the set of electrodes 104. Conversely, if both sensing electrodes are covered with water, a signal output by level sensor 128 is coupled to the electronic controls 122 to permit power to the set of electrodes 104. Alternatively, a single sensing element such as a float, a resistor, or the like, may be used that provides a signal to the electronic controls 122 when the individual sensing element is covered with water.

As a further alternative, the system control circuit 118 may also include input from an orientation sensor circuit 130 to detect whether the housing 106 is properly oriented. When the housing 106 is not properly oriented, the orientation sensor 130 provides a signal to the electronic controls 122 to prevent power to the electrodes 104. Conversely, when the housing 106 is properly oriented, the orientation sensor provides a signal to the electronic controls 122 to permit power to the electrodes 104 if all other operating conditions are met. The orientation pick-up for input to the sensor may be implemented using any number of acceptable technologies known in the art that provides an output signal indicative of orientations relative to gravity or to some other object.

Figure 5:
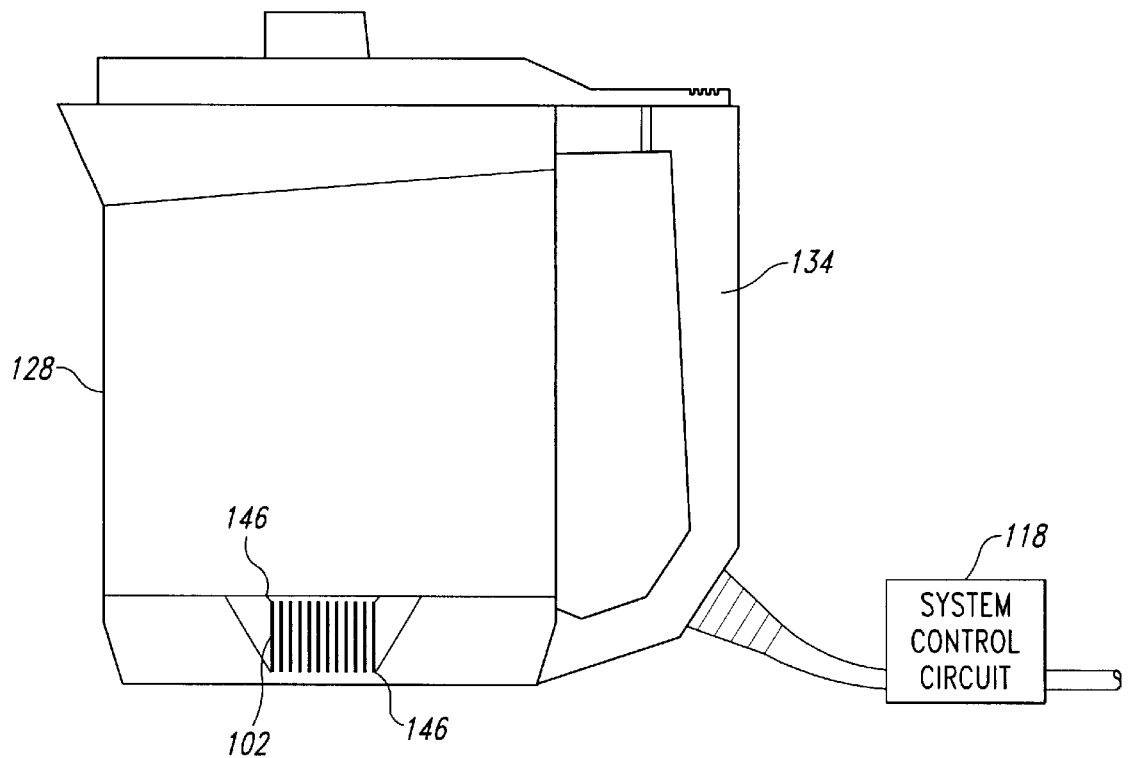
FIG. 5 is a side elevational cut-away view of the inventive cell and a water container combination, with a system control circuit.

FIG. 5 shows a hand portable water purification system 100 that includes a watertight container 132 having a handle 134 and the portable electrolytic cell 102. The cell 102 is controlled by the system control circuit 118. The watertight container 132 can be filled with water in the bottom and the portable electrolytic cell 102 submerged in water without causing damage to the electronics or the electrical connections of the portable system control circuit 118.

The cell 102 of FIG. 5 may include level sensor pick-ups 146, preferably on opposite diagonal corners of housing 106. When both pick-ups are covered by water, a signal is emitted to circuit 128, indicating that the cell 102 is assured of being fully covered by water, regardless of its orientation in the container.

An example of the operation of the cell 102 in combination with the container 128 will now be described. The container 128 has its power cord plugged into the wall socket, similar to that of an automatic coffeepot. The system control circuit 118 steps down the voltage and provides DC power of the desired voltage and current to the cell 102. The cell 102 is spaced a selected distance of the bottom of the container 128 so that water may flow around, under, through and up out of the housing 106. Circulation between the electrodes 104 is therefore set up when power is applied to the electrodes 104. When the user desires to treat the water with oxygenation, they fill the container 128 with water and plug it into the power supply. The cell 102 is an integral part of, and fixedly connected into the bottom portion of the container 128 so it is automatically assured of having the correct spacing above the bottom for water circulation and being surrounded by water when the container is in an upright position and has water therein. The user then programs the system control circuit 118 to oxygenate the water in a desired sequence and at a desired time. For example, if a user wishes to have instant oxygenated water, they may simply push the on a switch and indicate that oxygenation should begin immediately. After a desired time period as determined by the user, for example, after 2 or 3 minutes, the user may then switch the power off and pour the treated water into a glass and drink it immediately. The user therefore has direct control from the user control panel 126 as shown in FIG. 4 to turn the cell on to provide further oxygenation or to turn the cell off to terminate oxygenation as desired. As an alternative, the user may follow the timing control pattern as described and shown in FIG. 6.

Figure 6:
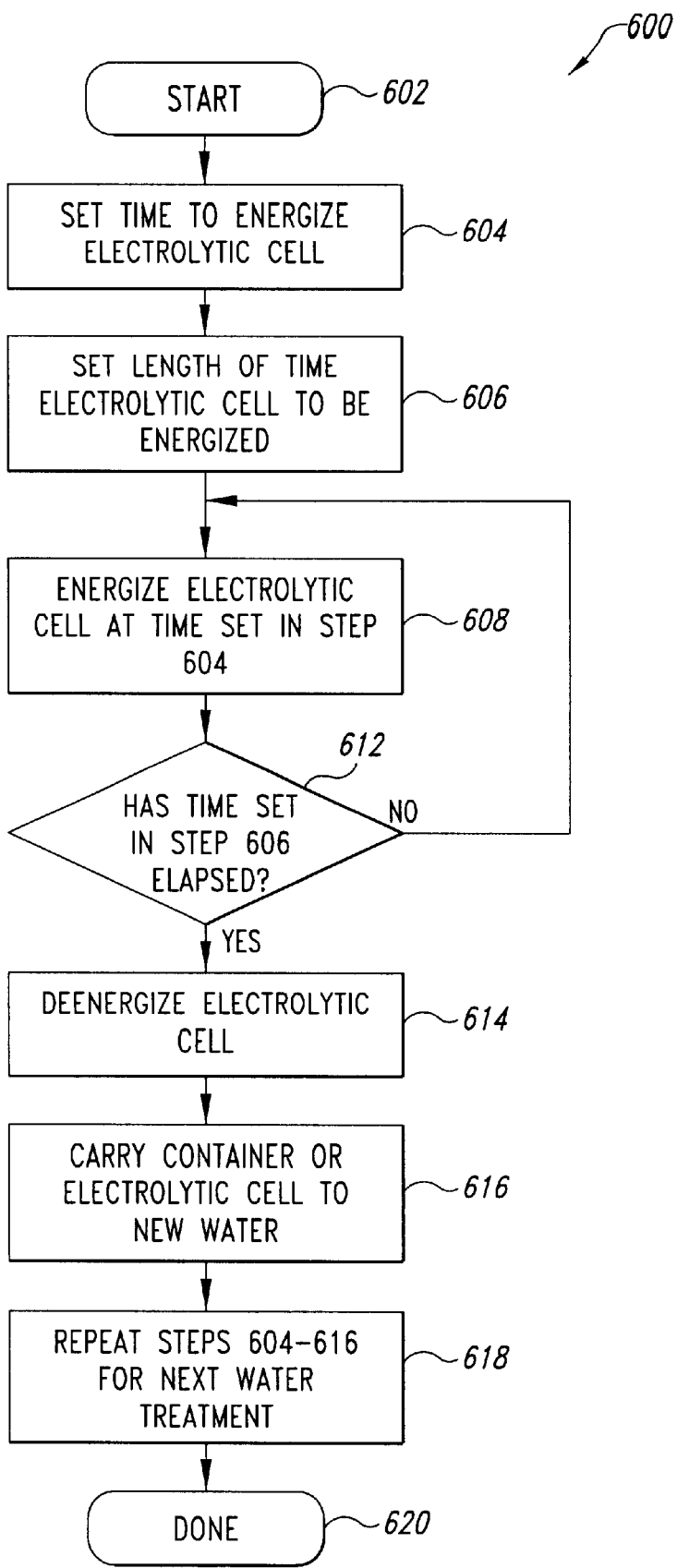
FIG. 6 is a flow chart of one method of operation of the inventive device.

According to the embodiment of FIG. 6, the user inputs signals into the user control panel in step 604 to set a time at which the cell will begin to be energized for oxygenation of the water. The user will then input a set time for which the oxygenation is to be carried out in step 606. For example, the user may program the pot in the evening to begin oxygenation the next morning at 6:00 a.m. and continue for 15 minutes. When the user arrives in the kitchen at 6:30 a.m. the next day, the oxygenation will have been completed, and the water will have a very high dissolved oxygen content ready for drinking or use in making coffee, orange juice, or other drinking beverage.

At the appropriate time, as stored in the memory register of the electronic controls, and/or in the timer, the cell 102 is energized and power is provided in step 608. This causes the water to begin oxygenation. As oxygen gas is created, bubbles are placed into the water which naturally rise. The oxygen bubbles, together with the hydrogen bubbles, cause the water out of the cell to rise rapidly, which results in good circulation of the water through the system as water is sucked from the bottom up through the cell and out the top. Much of the hydrogen gas remains in gaseous form and exits to an air vent at the top of the container 132. Much of the oxygen gas dissolves into the water and becomes dissolved oxygen trapped in the water. Though, of course, some of the oxygen gas will remain in gaseous form and gas off as well. When the elapsed time is expired, step 612, the power is shut off and the cell is deenergized as in step 614. The water is now ready for use. The user may pick up the handle 134 and pour a glass of water for use in direct drinking, or in making coffee, orange juice, or other beverage. The user can also pick up the pitcher as in step 616, carry it to the sink and fill it again with water and then replace it for further use.

Figure 7:
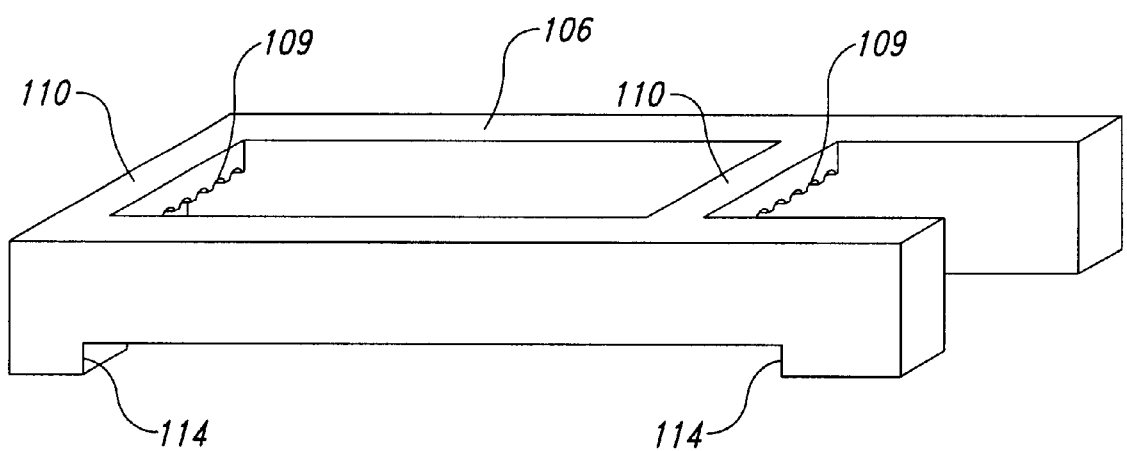
FIG. 7 is an isometric view of an alternative housing.
Figure 8:
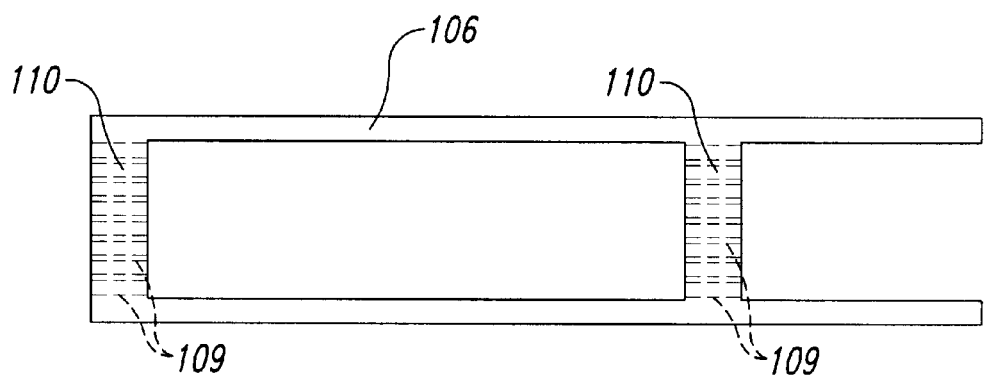
FIG. 8 a top view of the alternative housing of FIG. 7.

FIG. 7 illustrates an alternative embodiment for the housing 106, shown without the plates 104 therein for clarity. The housing 106 includes standoff legs 114 which hold the plates a selected distance above the bottom so the water may freely circulate under and around the housing. Brackets 110 contain slots 109 into which the individual plates 104 are positioned to hold them in a rigid location relative to each other. FIG. 8 is a top view of the housing of FIG. 7 again, without the plates 104 shown therein for clarity. Of course, the housing can have many alternative shapes and designs beyond those shown in FIGS. 1, 2, 7, 8 and other Figures herein. Any suitable housing which maintains the relative spacing of the plates 104 and the position of the cell is acceptable.

Figure 9A:
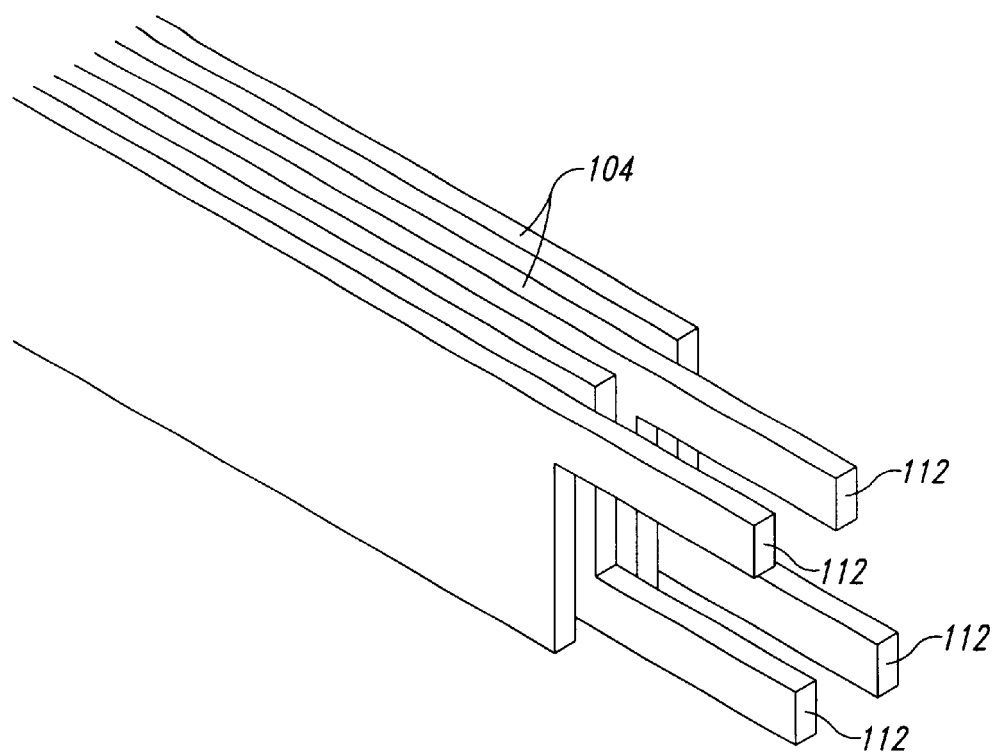
FIG. 9A is an end view of the electrodes showing one alternative method of connecting them together.

FIG. 9A illustrates individual electrodes 104 and a possible technique for electrical connection between the electrodes. Each of the electrodes 104 has a tab 112 extending from one end thereof. Every other electrode has a tab at the top, and every other electrode has a tab at the bottom. The tabs may be at the other end thereof as well, if desired. According to a first embodiment, the tabs 112 remain straight and a first electrical connection at the top thereof connects all the tabs 112 at the top portion to a negative side of a power supply. Similarly, an electrode at the bottom connects all of the tabs 112 of the bottom portion to a positive power supply. The electrodes are therefore all connected in parallel with the full battery voltage applied again across each electrode. Additional techniques are shown and described in the previous U.S. patents which have been incorporated herein by reference.

Figure 9B:
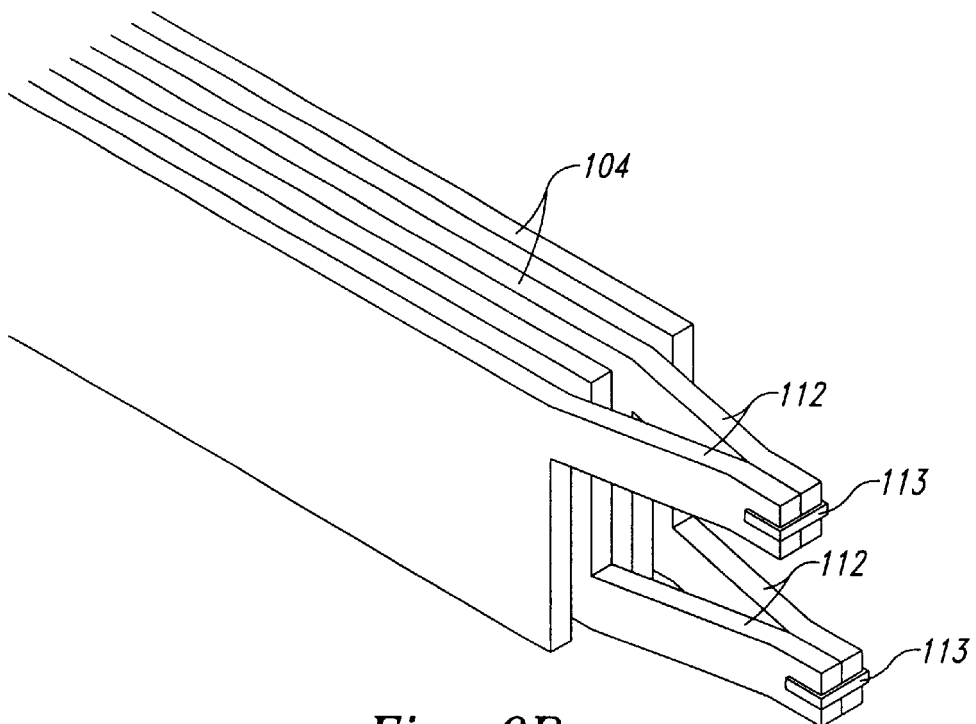
FIG. 9B is an end view of the electrodes of FIG. 9A showing them connected together.

FIG. 9B illustrates a fast connection clip technique in which the tabs 112 are bent and clips 113 are placed at the end of alternating tabs 112 for quickly and easily connecting them together as pairs. This is an easy manufacturing process and may shorten the time to manufacture and have the same electrical results.

Figure 10:
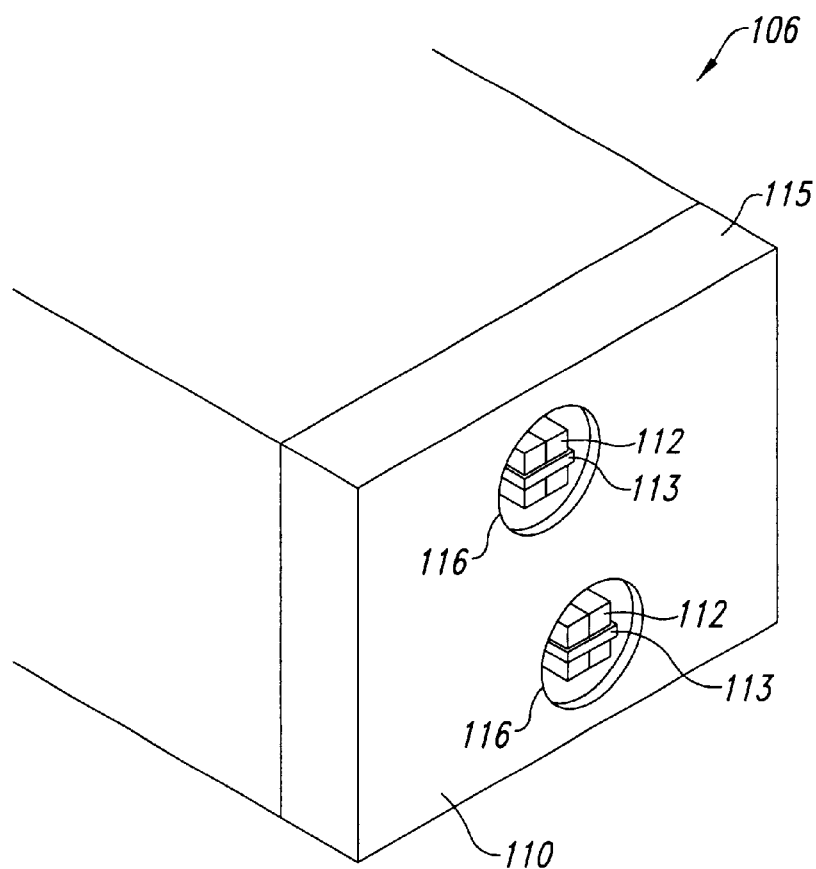
FIG. 10 is an end view of an alternative housing with a cut-away showing a technique for connecting the electrodes to each other.

FIG. 10 shows yet a further alternative embodiment, generally along the lines of FIG. 9B. According to this alternative embodiment, a housing cap 115 contains electrical connections 116. The electrical connections 116 mate with the tabs 112 to hold them together, as well as electrically connect them to each other. This is a quick and common easy manufacturing method by which the housing is assembled simultaneously with the electrodes being connected to each other in a proper manufacturing technique. This end cap 115, may, for example, be at a top portion thereof similar to the electric power supply 112 so as to both retain the plates and also provide the final electrical connection therefor.

Figure 11:
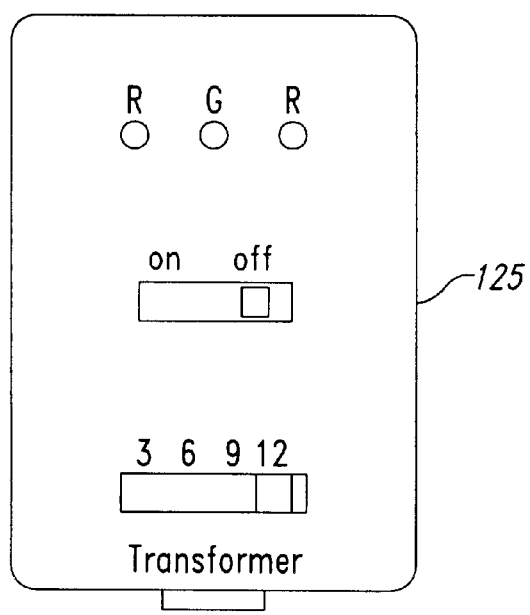
FIG. 11 is a front view of a first power supply for operation from wall outlet power.
Figure 12:
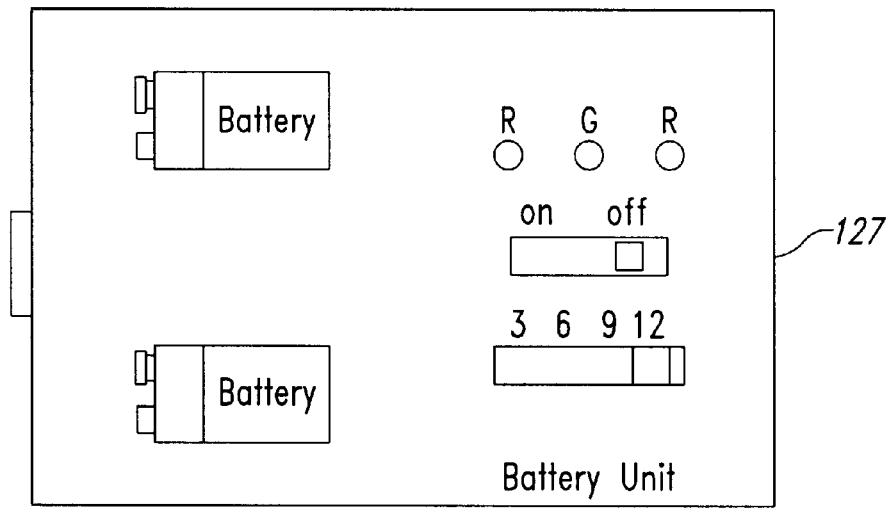
FIG. 12 is a front view of a battery operated supply.
Figure 13:
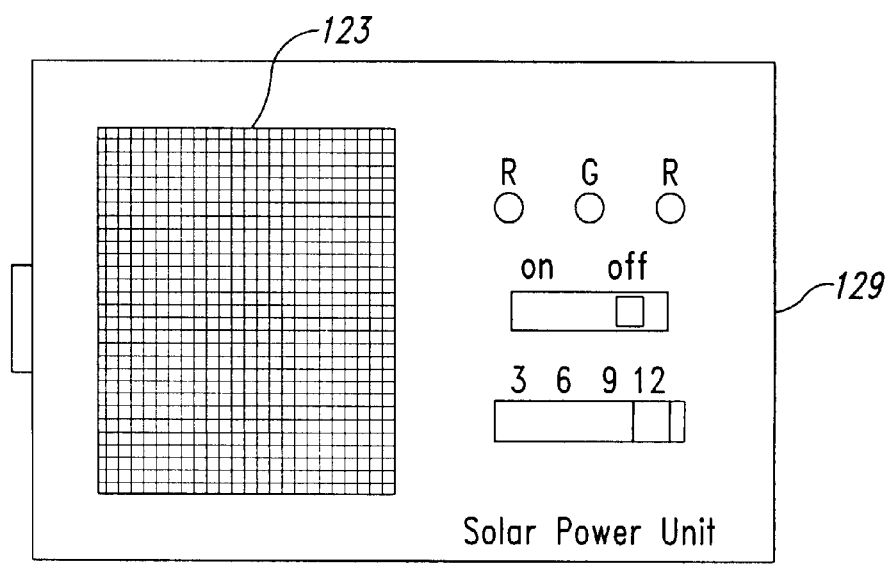
FIG. 13 is a front view of a solar power operated power supply.

FIG. 11 shows a simple housing 125 which includes an on/off switch and a transformer for a direct connection to the AC power supply. The transformer steps the power down for usage by the electronic controls 118 and provides it on line 120. FIG. 12 shows a similar housing 127 and power supply 124 in which battery is the source of the power. Again, the output of the power supply 124 is provided on line 120 to the electronic controls 118. FIG. 13 shows a similar housing 129 which includes a solar power source 129 having a solar plate 123. The solar plate 123 receives sunlight and generates electric power in a manner well known in the art. Each of the power units shown in FIGS. 11, 12 and 13 include an output switch by which the output voltage can be selected from a range of 3 to 12 volts in 3 volt increments. Of course, power supplies can be provided with a higher or lower voltage output as desired. These all represent very simple versions of the control circuit 118 since it includes only the power adapter and an on/off switch for the user control panel and the electronic controls.

In one preferred embodiment, the power supply unit is in the same housing, integral with a more complex control circuit 118. In this embodiment, the power supply unit corresponds to the power adapter 121 within the system control circuit 118. The user control panel 126 has the appropriate selection buttons and visual display readout to permit selection of the appropriate power supply and output voltage if this is needed. Of course, much of this will be automatically provided on the control of the central electronic controls 122 so that the user control panel includes switches for on and off, timing, programming and other functions, but does not include a voltage selection switch or the like.

Figure 14:
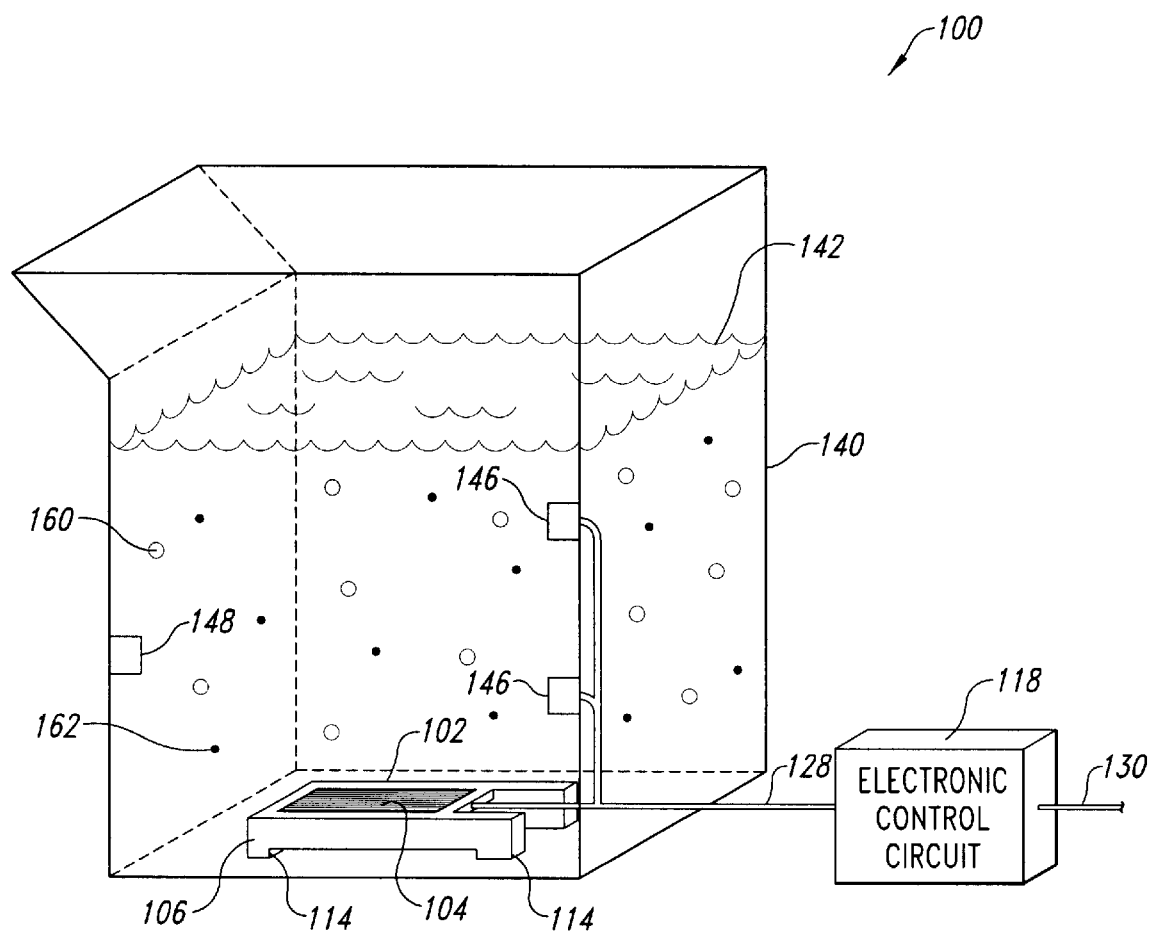
FIG. 14 is an isometric view of one embodiment of the inventive portable electrolytic cell in combination with a water container.
Figure 15:
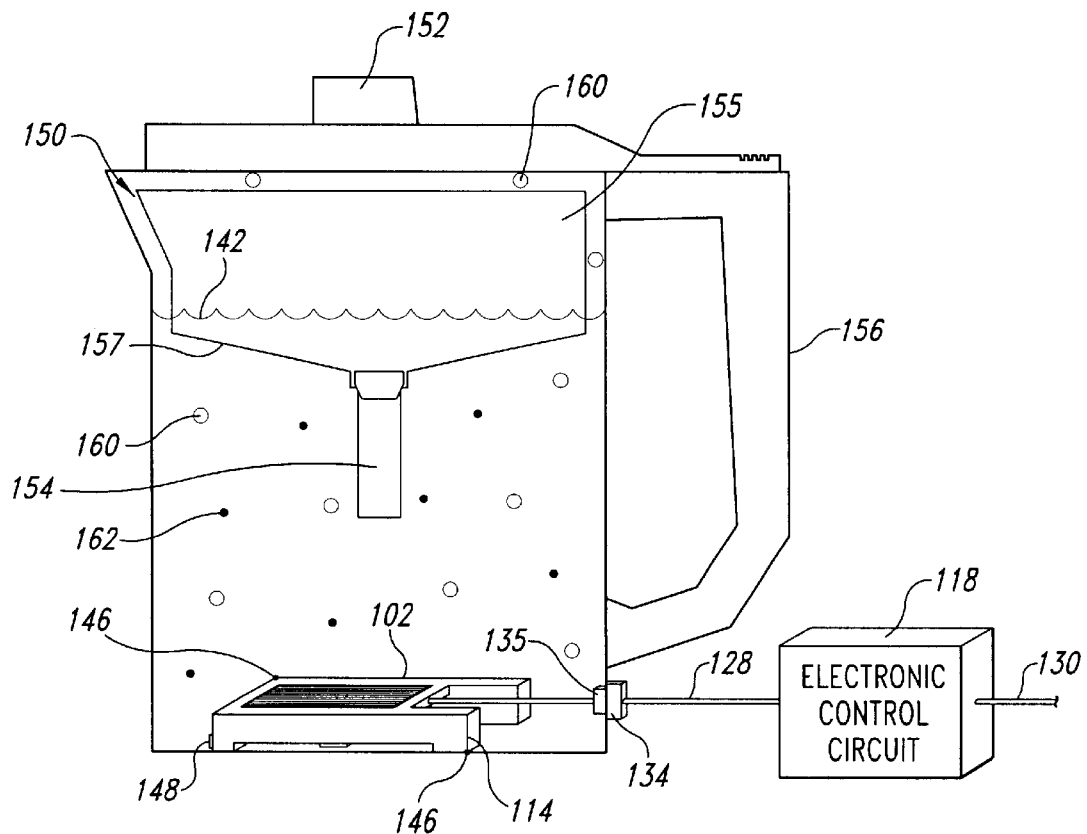
FIG. 15 is a further alternative embodiment of the inventive portable electrolytic cell in a different water container, after the water has been filtered.

FIGS. 14 shows in one embodiment, the portable electrolytic cell 102 and the system control circuit 118 connected to a container 140. In FIG. 14, the cell 102 is fixed in the container, but in FIG. 15, both the portable electrolytic cell 102 and the system control circuit 118 are detachable from the container 140. In the embodiment of FIG. 15, a container connector 135 is located on an inside wall of the container 140 to receive the electrolytic cell 102. A system control circuit connector 134 is located on an outside wall of the container 140 to receive the connection from the system control circuit 118. The connectors 135 and 134 are waterproof to permit easy removal and coupling. The container 140 includes water 142 at any desired level.

When the portable electrolytic cell 102 is in the container 140, standoffs 114 maintain the portable electrolytic cell 102 off the bottom of the container 140 such that, when in use, water flows easily around portable electrolytic cell 102 and through the individual electrodes within the set of electrodes 104. The level sensor pick-up 146 is installed on an inner wall of the container 140. The orientation sensor pick-up 148 is also installed on the inner wall or walls of the container 140. A connection from sensor 146 back to the control circuit 118 is provided so that only when both sensors 146 are covered with water can power be provided to the cell.

In the embodiment of FIG. 15, the water level sensor 146 is on the cell itself, so that the cell can be operated when there is sufficient water to cover the cell. The two sensors 146 are positioned at opposite, diagonal corners on the top and bottom so that if both sensors are covered with water, the cell is assured of being covered with water. The orientation sensor 148 is not needed in this embodiment. If it is desired, it can be added on one standoff 114. A vent 150 is provided to allow gases to escape to the atmosphere.

The portable electrolytic cell 102 may be mounted in the container 140 either permanently or as a detachable portable electrolytic cell 102. To maintain the portability of the hand portable water purification system 100, the container 140 is small enough and light enough such that a person may carry the hand portable water purification system 100 in one hand with the control circuit 118 attached and the electrolytic cell 102 inside. Preferably, the container 140 holds between one-half and five gallons of water.

FIG. 15 shows the container 140 with a lid 152, any well-known chemical/mechanical filter 154, a holding tank 155 to retain the water as it flows through the filter 159, and a handle 156. The underside 157 of the holding tank 155 can be roughened to produce an irregular surface containing indentations, such as grooves, pockets, hash marks, etc. This will hold more oxygen gas in the water when it rises to the top. The hydrogen gas 160 will go to the top and gas out while the oxygen gas 162 will generally dissolve in the water.

Figure 17:
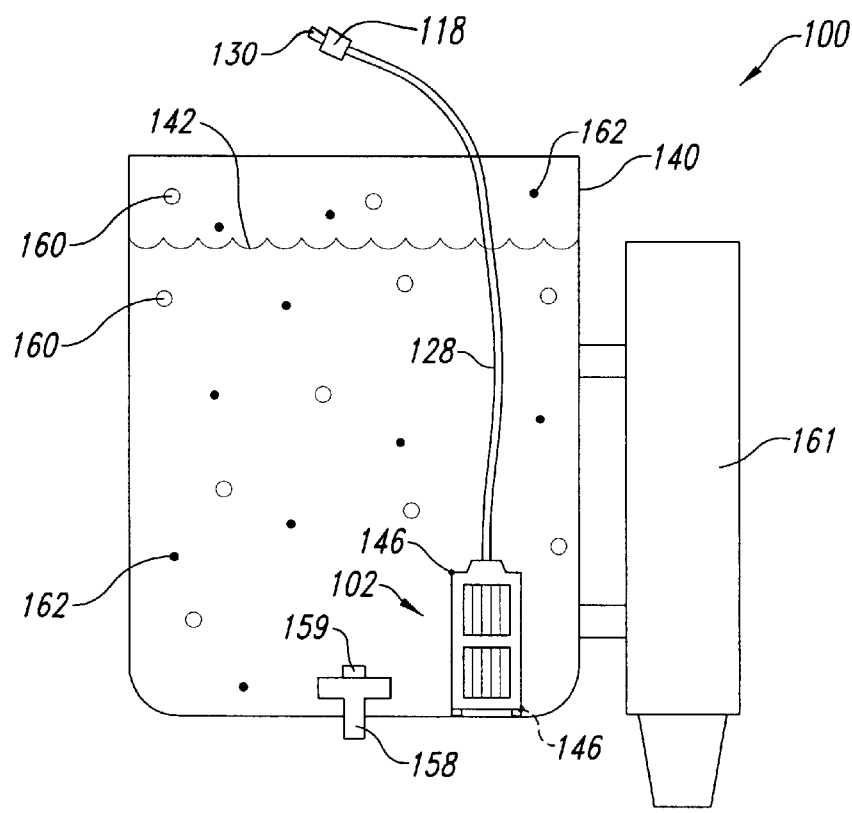
FIG. 17 is a side elevational view of the inventive portable electrolytic cell in an office water container.

The hand portable water purification system 100 may also include a spigot 158, as depicted in FIG. 17, positioned near the bottom of the container 140 such that water may be easily dispensed from the container 140. The spigot 158 may be a normally closed outlet valve.

Figure 16:
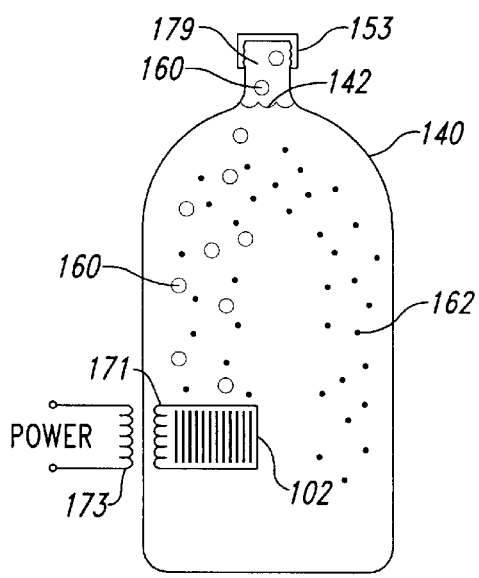
FIG. 16 is a side elevational view of the inventive portable electrolytic cell inside a closed water bottle having water inductively supplied through the side of the water bottle.

FIG. 16 illustrates another embodiment according to principles of the present invention. In the embodiment of FIG. 16, an airtight cap 153 is placed on the container 140. The container is filled with water to a level as indicated at 142 or lower. The container 140 is a sealed container and does not contain any electrical connections from the inside to the outside of the container. The cell 102 inside the container includes an inductive power pickup 171 which is in close proximation to an inductive power transfer source 173 on the outside of the container. Power transfer using inductive couplings of this type is extremely well known in various arts and can be easily provided from such known arts for connection to the cell 102. For example, in one embodiment, the inductive power transfer circuit may be a simple AC transformer with an AC to DC converter inside the container 140, adjacent the cell. Any other well-known inductive power transfer source is also acceptable. Power is provided to the power generation circuit 173 under the control of the electronic control circuit 118 in a manner previously described.

The embodiment of FIG. 16 using a closed container has an advantage that significantly higher dissolved oxygen can be attained in the water because it is a sealed, airtight container. The air gap 179 permits hydrogen gas to be collected, which remains in gaseous form. Oxygen gas 162, on the other hand, is more easily retained by and dissolved in the water. The oxygen gas 162 will largely remain in the water and at much higher concentration than would otherwise be possible if the container were open to the atmosphere. Having the sealed container therefore significantly increases the oxygen content of the water 142. When the cap 153 is removed, the hydrogen gas will quickly escape harmlessly into the atmosphere, since it has largely remained in gaseous form. The oxygen gas, on the other hand, has been dissolved in the water and, even if the cap is left off, it will largely remain inside the water since the surface air for gas is now very small. Further, the user may replace the cap 153 back on the container, sealing the container. A small amount of oxygen will gas out into the open space 179 to equalize the oxygen content in the gas form within the water after which no more oxygen will leave the water but will remain in the stable, dissolved state. An elevated oxygen content of the water can therefore be maintained for a long period of time, with water being removed for consumption by the user as desired, and then the cap replaced. A similar result can be achieved by oxygenizing the water in a container of the type shown in FIGS. 5, 14 or 15 and then pouring it into a sealable container 140 with a cap 153 placed thereon. The hydrogen gas will be gone already and a high oxygen content will be maintained.

The operation of one embodiment of the hand portable water purification system 100 will now be described with reference to FIGS. 14–16. The housing 106 includes standoffs 114 positioned such that the portable electrolytic cell 102 ensures good water circulation. Water to be purified is poured into the container 140. The user turns on the hand portable water purification system 100 and a DC voltage applied to the portable electrolytic cell 102 causes current to flow among the set of electrodes 104. The current flow causes some of the water molecules to dissociate into hydrogen gas 160 and oxygen gas 162. A portion of the oxygen gas 162 is dissolved into the water, while the remaining oxygen gas 162 and some of the lighter gases, such as hydrogen gas 160, escape to the atmosphere. In the case of a closed container shown in FIG. 16, the gas collects in pocket 179 for release upon opening the cap. The dissolved oxygen attacks bacteria that may be present in the water.

Alternatively, when chlorides are present in the water, chlorine gas 162 may be generated when electrolytic cell 102 is energized and current flows among the electrodes 104. A portion of the chlorine gas 162 is dissolved into the water. The chlorine also attacks the bacteria that may be present in the water.

The system control circuit 118 provides a wide range of user related options for timing on control. The user may set the time to begin immediately and have a duration of any desired time, likely in the range of 2–7 minutes. Immediately afterward, the user may drink the water. Alternatively, the user may filter the water as shown in FIG. 15 and place the container in the refrigerator. In this way, the water will be cold before the oxygenation and it holds more oxygen. The user may cause oxygenation of and then drink the water any time after this. For example, the user may typically place the system to operate in the middle of the night, or early morning, and then upon rising, have highly oxygenated water to drink. The user may also desire to give this water a short boost, such as a 30 sec. boost, since it was oxygenated once a few hours before on an automatic clock and the short boost will restore some of the oxygen level.

If the container 140 has the level sensor 146 installed, the level sensor 146 determines whether the water level in the container 140 is sufficient for proper operation of the hand portable water purification system 100. The orientation sensor 148 determines that the container 140 is properly oriented.

FIGS. 17, 18, 19 and 20 are example uses of an embodiment of the portable electrolytic cell 102. In these embodiments, the electrolytic cell 102 and the control circuit 118 are a single assembly which are easily transportable by hand. They are not part of any container, but instead, can be placed within any container as desired by a user. These FIGS. 17–20 show use of the electrolytic cell of the type illustrated in FIG. 3. According to this embodiment, the user carries the electrolytic cell 102 together with the appropriate power supply cord 128 and electronic controls 118 for that particular electrolytic cell. The power input 130 can be from any source, such as battery, solar powered, wall outlet, as shown in FIGS. 3–5 or 11–13 or others as previously described. The user thereafter locates a container 140 into which they wish to place the electrolytic cell 102. The electrolytic cell 102 contains water level sensors 146 so that it is assured of being covered with water before operation commences. As previously described, the water level sensors 146 are preferably on opposite sides, and on a diagonal through the housing from each other so that if both are covered with water, is assured that the entire cell is covered with water and safe operation can proceed. If an extremely low-cost application is desired, the water sensors 146 need not be present. In this case, the user will have to be careful to operate it only when the cell is completely submerged in water. Of course, the cell will operate if only partially submerged in water or, not submerged at all. However, it will not be as efficient in operation. Since the voltage is so low, touching of the cell plates by a person will not cause shock or present other health or danger issues. However, since the cell is designed for operation in water, it will operate with more reliability if it is only operated while completely submerged in water.

In the embodiment shown in FIG. 17, the user has chosen to place the cell 102 into a large water dispensing tank 140. It includes a spigot 158, and a cup dispenser 161. This may be a container of the type to be used with a group of people and therefore the cell may be programmed to operate continuously or, turn on and off on a set cycle, such as for thirty minutes every 2 hours so as to ensure that the water always contains a high oxygen content. A container of this type may, for example, be in the range of 5 to 20 gallons.

Figure 18:
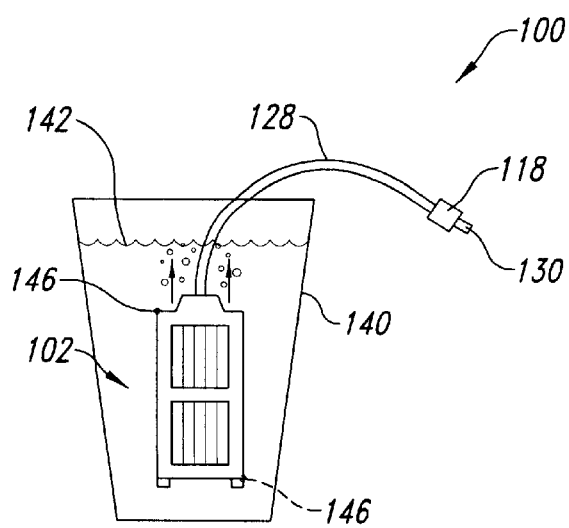
FIG. 18 is a side view of the inventive portable electrolytic cell in a glass of water.

FIG. 18 shows a container 140 which is a single drinking glass. The glass 140 is of a standard size, which, under normal conditions would be sufficiently large to hold the cell 102. Alternatively, the cell 102 can be somewhat miniaturized to be half the standard size so that it can easily fit into a glass 140. While this would mean that the overall oxygen production would be less than that of the larger cell, since the water to be oxygenized is a very small volume, such as that which would be contained in a single glass, even a small cell 102 is sufficiently large to generate the desired amount of oxygen.

In the embodiment of FIG. 18, the user fills the glass with water and then places the cell 102 in the glass and turns on the timer for a brief period of time sufficient to oxygenize the water in the glass. This may, for example, be one minute or less. Of course, the user may desire to oxygenate for a longer period of time, so as to completely sanitize and saturate the water with oxygen. After the water is sufficiently saturated with oxygen as desired by the user, the cell 102 is removed from the glass and the user drinks the water directly from the glass itself. This is a very convenient, and highly-desirable use of the electrolytic cell 102. This permits personal water treatment for an individual on an as-needed basis. There is no need for water storage or other pipes and control systems associated with a large storage system in order to obtain treated water.

Figure 19:
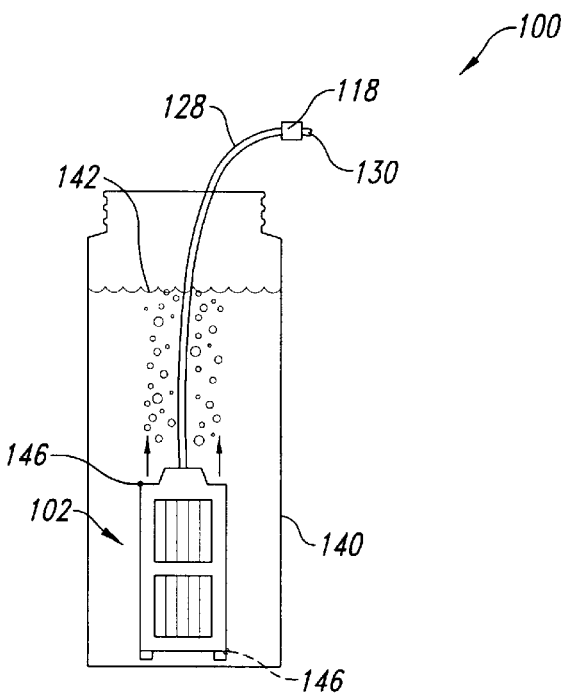
FIG. 19 is a side elevational view of the inventive portable electrolytic cell in a water jug.

FIG. 19 illustrates the embodiment in which the container 140 is a simple water jug of the 1 to 2 gallon size which is portable and easily carried by hand. Use of the electrolytic cell 102 with the water jug 140 is similar to that with the glass 140. Again, the user fills the container to the desired level with water and then places the electrolytic cell therein. Energy is provided to the electrolytic cell 102 for a desired time period to achieve an oxygen level in the water as the user desires for immediate consumption.

The portable electrolytic cell and the use thereof as illustrated in FIGS. 18 and 19 provide incredible advantages not previously possible without the use of chemicals or expensive non-reasonable filters. Without the use of this invention, individual users were required to treat water with chemical tablets, such as iodine or other techniques. Alternatively, mechanical filters could be used to screen the bacteria and other debris in the water. Such prior art chemical treatment or filtering techniques often made the water less healthy from an overall consumption standpoint and not as delicious to the taste. Iodine tablets or similar chemicals leave an undesired aftertaste in the water and, in high concentrations, are not beneficial for human consumption.

According to this embodiment of the present invention, an individual user is able to carry the portable water treatment system wherever he or she goes, whether traveling in the U.S. or in any country of the world. Upon arriving at a desired location, the user may fill a container 140 of desired size with water. The container 140 may be a single glass, a water jug which holds multiple glasses of any size. The user can then completely treat the water by placing the cell therein and electrically activating the cell 102. Of course, the power adapter can be provided to plug in to outlets from any country of the world and operate on any standard voltage throughout the world. After a selected time period and depending on the starting state of the water, the water treatment will kill most or all of the harmful bacteria, as well as putting healthy levels of oxygen into the water. To the extent desired, a drop or two of various chemicals, such as chlorine, can be added which will also react when the cell is operated. This will create a powerful and rapid cleansing system to ensure that all bacteria is killed immediately. At the same time, when the user drinks the water a few moments later, it will have the fresh oxygen-rich taste of stream water.

Figure 20:
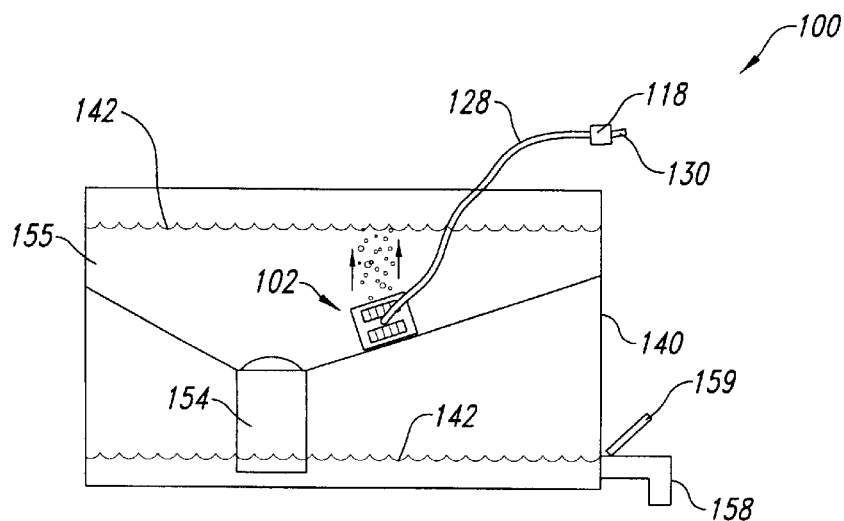
FIG. 20 is a side elevational view in a portable electrolytic cell in a filtration water unit with the treatment occurring prior to filtration of the water.

FIG. 20 illustrates further alternative use of the electrolytic cell 102. According to this embodiment, the water is treated before it is passed through the filter 154 by placing it in the holding tank 155. The user may at times desire to provide water treatment before mechanical filter so as to somewhat purify the water and remove bacteria prior to passing through the filter. The filter 154 which may be of the activated charcoal type, screen or other desired type that removes debris and many small particles after which the water enters the main container 140 where it can be removed via spigot 158 by the control of knob 159, or, by any other acceptable technique.

The container 140 may be translucent so as to allow viewing of the fluid dynamics of the oxygenation process by allowing the user to watch the oxygen bubbles 162 and the hydrogen bubbles 160 form when the gases are being released. With this feature, the user also watches the oxygen bubbles 162 and the hydrogen bubbles 160 rise in the container 140. The translucent container lets the user see the oxygen bubbles 162 disappear and the hydrogen bubbles 160 float upwards until they escape. This embodiment is aesthetically pleasing. In another embodiment, the container 140 may be made of materials of different colors. This example embodiment provides an artistic visual effect, as well.

With these and other features, the hand portable water purification system 100 increases the dissolved oxygen content and chlorine action of water significantly. For a given starting dissolved oxygen content and water temperature, electrolysis utilizing the present invention can cause the dissolved oxygen content of the filtered water to increase significantly. Moreover, if the water to be treated is chilled prior to electrolysis, then the increase in dissolved oxygen content may be even greater than in warm water. For example, if the dissolved oxygen content starts at about 8 ppm it can be increased to 12 to 14 ppm using this invention. With chilled water, the range can be even higher, to exceed, for example 16 or 18 ppm. In other cases the percentage of dissolved oxygen will be double the starting percentage.

The hand portable water purification system 100 also is small enough to carry in a backpack or a picnic basket, for example. The hand portable water purification system 100 is small enough for kitchen countertop use. In one embodiment, the hand portable water purification system 100 typically has a container with a capacity of one gallon or less.

A hand portable water purification system has been described that increases the quantity of dissolved oxygen in water. The description is provided, for purposes of explanation, with specific and alternative electrical and mechanical components, as well as their interconnectivity, set forth to provide a more thorough understanding of the present invention. The present invention and claims are to be broadly construed and may be practiced without using all the specific details described herein.

The invention has been described and shown for a number of alternative embodiments. As will be appreciated, equivalent structures may be substituted for those shown herein in order to achieve the objects and purposes of the invention, the invention being as broad as the appended claims, and is not limited to the specific embodiments shown herein.

What is claimed is:

1. A hand portable water purification system for treating water which is at atmospheric pressure, comprising:
   a portable electrolytic cell comprising a set of electrodes and a housing, wherein the housing provides support for the set of electrodes;
   a portable water purification system programable control circuit coupled to the portable electrolytic cell, the portable water purification system programable control circuit providing direct current voltage to the set of electrodes when the portable electrolytic cell is immersed in water at atmospheric pressure to be purified, and
   wherein the combination of the portable electrolytic cell and the portable system programmable control circuit are of a size and weight as to be easily hand carried.

2. The water purification system according to claim 1 wherein the housing further comprises a stand-off that maintains a distance between the electrolytic cell and a container wall sufficient to ensure flow of water through the set of electrodes.

3. The water purification system according to claim 1 wherein the housing further comprises spacers that maintain gaps between individual electrodes within the set of electrodes.

4. The water purification system according to claim 1 wherein the housing further comprises water-permeable sleeve around the set of electrodes.

5. The water purification system according to claim 1 wherein the set of electrodes comprises two pairs of electrodes.

6. The water purification system according to claim 5 wherein the each electrode in each pair of electrodes is one in$^2$ in effective surface area.

7. The water purification system according to claim 5 wherein two individual electrodes are clipped together to produce each one of the pairs of electrodes.

8. The water purification system according to claim 5 wherein two individual electrodes are welded together to produce the pairs of electrodes.

9. The water purification system according to claim 5 wherein portable water purification system control circuit comprises a timer.

10. The water purification system according to claim 5 wherein portable water purification system control circuit comprises a user control panel.

11. The water purification system according to claim 1, further comprising a watertight connector between the portable water purification system control circuit and the portable electrolytic cell.

12. The water purification system according to claim 1, further comprising a container within which the electrolytic cell is located.

13. The water purification system according to claim 12, further comprising a water level sensor mounted in the container.

14. The water purification system according to claim 12, further comprising an orientation sensor mounted in the container.

15. The water purification system according to claim 12, further comprising a handle connected to an outer wall of the container.

16. The water purification system according to claim 12 wherein the container cannot hold more than one gallon of liquid.

17. The water purification system according to claim 12 wherein the container can hold no more than five gallons of liquid.

18. The water purification system according to claim 12, further comprising an outlet valve mounted on the container, the outlet valve having means for biasing the outlet valve in a closed position.

19. The water purification system according to claim 12, further comprising a cover on the container.

20. The water purification system according to claim 19, further comprising a filter mounted in the cover.

21. The water purification system according to claim 19, further comprising a roughened surface on an underside of the cover.

22. An apparatus for oxygenating water, comprising:
a programmable portable electrolytic cell having a housing and two pairs of electrodes, wherein two individual electrodes are clipped together to produce each one of the pairs of electrodes;
a power source;
a electrolytic cell control circuit having a timer and a microprocessor to program the operation of the electrolytic cell;
a watertight connector between the electrolytic cell and the control circuit,
wherein the combination of the programmable electrolytic cell and the electrolytic cell control circuit are of a size and weight as to be easily hand carried.

23. The water purification system according to claim 22 wherein the housing further comprises water-permeable sleeve around the two pairs of electrodes.

24. The water purification system according to claim 1 wherein the housing further comprises a stand-off that maintains a position of the portable electrolytic cell within a container sufficient to ensure flow of water through the two pairs of electrodes.

25. A hand portable apparatus for purifying water, comprising:
a container for holding water;
a programmable electrolytic cell having a set of electrodes, the electrolytic cell being mounted in the container;
a power source terminal connected to the set of electrodes through the container;
wherein the combination of the container, the electrolytic cell and the power source terminal are of a size and weight as to be easily hand carried.

26. The apparatus according to claim 25, further comprising a control circuit coupled to the set of electrodes through the container to program the operation of the hand portable apparatus.

27. The apparatus according to claim 25, further comprising means for detecting the level of water in the container.

28. The apparatus according to claim 25, further comprising a lid for covering the container.

29. A method to increase the quantity of dissolved oxygen in water, comprising the steps of:
programming an electrolytic cell to energize at a predetermined point in time and to remain energized for a predetermined duration of time using a control circuit via a power source, the predetermined duration of time corresponding to a target dissolved oxygen content of water, the electrolytic cell being mounted in a container;
in response to the programming, energizing the electrolytic cell at the predetermined point in time;
circulating water through the energized electrolytic cell for the predetermined duration of time such that the target dissolved oxygen content of the water is thereby achieved;
transporting the container with the electrolytic cell, control circuit, and power source as a single assembly by hand.

* * * * *